United States Patent
Lim et al.

(10) Patent No.: US 10,045,338 B2
(45) Date of Patent: Aug. 7, 2018

(54) METHOD FOR RESOURCE ALLOCATION OF WIDEBAND FRAME IN WIRELESS LAN SYSTEM AND APPARATUS THEREFOR

(71) Applicant: LG ELECTRONICS INC., Seoul (KR)

(72) Inventors: Dongguk Lim, Seoul (KR); Jinyoung Chun, Seoul (KR); Hangyu Cho, Seoul (KR); Wookbong Lee, Seoul (KR); Jinsoo Choi, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/532,365

(22) PCT Filed: Dec. 1, 2015

(86) PCT No.: PCT/KR2015/012967
§ 371 (c)(1),
(2) Date: Jun. 1, 2017

(87) PCT Pub. No.: WO2016/089078
PCT Pub. Date: Jun. 9, 2016

(65) Prior Publication Data
US 2017/0367090 A1 Dec. 21, 2017

Related U.S. Application Data

(60) Provisional application No. 62/086,657, filed on Dec. 2, 2014.

(51) Int. Cl.
*H04W 72/04* (2009.01)
*H04L 5/00* (2006.01)
(Continued)

(52) U.S. Cl.
CPC ....... *H04W 72/0426* (2013.01); *H04L 5/0035* (2013.01); *H04L 5/0053* (2013.01);
(Continued)

(58) Field of Classification Search
CPC . H04W 72/00; H04W 72/04; H04W 72/0426; H04W 72/0446; H04W 72/08;
(Continued)

(56) References Cited

U.S. PATENT DOCUMENTS

2011/0194500 A1* 8/2011 Kim ................. H04L 1/1854
370/328
2012/0250633 A1* 10/2012 Arnott .............. H04L 5/0094
370/329
(Continued)

FOREIGN PATENT DOCUMENTS

| EP | 2765729 A1 | 8/2014 |
|---|---|---|
| KR | 10-2011-0103357 A | 9/2011 |
| KR | 10-2014-0066261 A | 5/2014 |

*Primary Examiner* — Warner Wong
(74) *Attorney, Agent, or Firm* — Birch, Stewart, Kolasch & Birch, LLP

(57) ABSTRACT

A method for resource allocation in a wireless LAN system according to an embodiment of the present invention is characterized in that an access point (AP) sends a frame comprising a signaling field and a data field to one or more stations, wherein the signaling field comprises a first signaling field (SIG A field) including first common control information for the one or more stations and a second signaling field (SIG B field) including individual control information for each of the one or more stations, wherein the second signaling field includes resource allocation information for data transmission to the one or more stations, and wherein the resource allocation information comprises resource allocation information for data to be transmitted in a frequency band different from a frequency band in which the second signaling field (SIG B field) is transmitted.

15 Claims, 17 Drawing Sheets

(51) Int. Cl.
*H04W 72/08* (2009.01)
*H04W 72/00* (2009.01)
*H04L 12/801* (2013.01)
*H04L 12/54* (2013.01)

(52) U.S. Cl.
CPC ....... *H04W 72/0446* (2013.01); *H04L 5/0092* (2013.01); *H04L 12/5692* (2013.01); *H04L 47/18* (2013.01); *H04W 72/00* (2013.01); *H04W 72/08* (2013.01)

(58) Field of Classification Search
CPC ...... H04W 72/20; H04W 4/20; H04L 5/0035; H04L 5/0053; H04L 5/0092; H04L 1/1664; H04L 29/06183; H04L 65/10; H04L 5/0058; H04L 12/5692; H04L 27/2608; H04L 2012/5631; H04L 47/78; H04L 47/781
See application file for complete search history.

(56) References Cited

U.S. PATENT DOCUMENTS

| | | | |
|---|---|---|---|
| 2013/0188572 A1* | 7/2013 | Cheong | H04W 72/04 370/329 |
| 2013/0188672 A1 | 7/2013 | Cheong et al. | |
| 2014/0078966 A1 | 3/2014 | Erceg et al. | |
| 2014/0211775 A1* | 7/2014 | Sampath | H04W 28/06 370/338 |
| 2014/0286226 A1* | 9/2014 | Seok | H04W 56/00 370/312 |
| 2015/0280877 A1* | 10/2015 | Chen | H04L 5/0048 370/252 |
| 2015/0319747 A1* | 11/2015 | Chu | H04W 72/0406 370/330 |
| 2016/0128088 A1* | 5/2016 | Abdoli | H04W 72/1289 370/329 |
| 2016/0380731 A1* | 12/2016 | Kim | H04L 5/0007 370/329 |
| 2017/0105229 A1* | 4/2017 | Luo | H04W 72/121 |

\* cited by examiner (a)

| | B1 | B2 | B3<br>B5 | B6 B8 | B9 B23 | B24 B26 | B27 | B28 | B29 | B30 | B31 |
|---|---|---|---|---|---|---|---|---|---|---|---|
| | VHT=1 | Reserved | MRQ | MSI | MFSI/<br>GID-L | MFB | GID-H | Coding<br>Type | FB Tx<br>Type | Unsoli<br>cited<br>MFB | AC<br>Constraint | RDG/<br>More<br>PPD<br>U |
| Bits: | 1 | 1 | 1 | 3 | 3 | 15 | 3 | 1 | 1 | 1 | 1 | 1 |

(a)

| B9<br>B11 | B12<br>B15 | B16<br>B17 | B16<br>B23 |
|---|---|---|---|
| VHT<br>N_STS | MCS | BW | SNR |
| 3 | 4 | 2 | 6 |

(b)

| Frame Control | A1 | A2 | Sequence Control | A3 | A4 | Frame Body | FCS |
|---|---|---|---|---|---|---|---|
| Octets: 2 | 2 or 6 | 6 or 2 | 0 or 2 | 0 or 6 | 0 or 6 | variable | 4 |

(a)

| B0 B1 | B2 B4 | B5 B7 | B8 | B9 | B10 | B11 | B12 | B13 | B14 | B15 |
|---|---|---|---|---|---|---|---|---|---|---|
| Protocol Version | Type | PTID/ Subtype | From DS | More Fragments | Power Management | More Data | Protected Frame | End of Service Period | Relayed Frame | Ack Policy |
| Bits: 2 | 3 | 3 | 1 | 1 | 1 | 1 | 1 | 1 | 1 | 1 |

(b)

40 MHz

80 MHz

160 MHz

METHOD FOR RESOURCE ALLOCATION OF WIDEBAND FRAME IN WIRELESS LAN SYSTEM AND APPARATUS THEREFOR

CROSS REFERENCE TO RELATED APPLICATIONS

This application is the National Phase of PCT International Application No. PCT/KR2015/012967, filed on Dec. 1, 2015, which claims priority under 35 U.S.C. 119(e) to U.S. Provisional Application No. 62/086,657, filed on Dec. 2, 2014, all of which are hereby expressly incorporated by reference into the present application.

TECHNICAL FIELD

The present invention relates to a wireless local area network (WLAN) system, and more particularly, to a method for allocating resources to stations (STAs) for data transmission through a wideband frame and apparatus therefor.

BACKGROUND ART

While the proposed resource allocation method can be applied to various kinds of wireless communication systems, the WLAN system is taken as an example of the system to which the present invention can be applied.

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

Since the above-described standards for the WLAN technology maximally use bandwidth of 160 MHz and support eight spatial streams, IEEE 802.11ax standardization is being discussed in addition to IEEE 802.11ac standard maximally supporting a rate of 1 Gbit/s.

DISCLOSURE OF THE INVENTION

Technical Task

The technical task of the present invention is to provide a method for efficiently transmitting or receiving resource allocation information for multiple users in a WLAN system.

It will be appreciated by persons skilled in the art that the objects that could be achieved with the present invention are not limited to what has been particularly described hereinabove and other objects that the present invention could achieve will be more clearly understood from the following detailed description.

Technical Solutions

In a first aspect of the present invention, provided herein is a method of transmitting resource allocation information for data transmission to one or more stations (STAs) by an access point (AP) in a wireless local area network (WLAN) system, including transmitting, by the AP, a frame including a signaling field and a data field to the one or more STAs, wherein the signaling field may include a first signaling field (SIG A field) including first common control information for the one or more STAs and a second signaling field (SIG B field) including individual control information for each of the one or more STAs, wherein the SIG B field may include the resource allocation information for the data transmission to the one or more STAs, and wherein the resource allocation information may include resource allocation information for data to be transmitted in a frequency band different from that used for transmitting the SIG B field.

The SIG B field may be configured such that independent control information is transmitted in a first 20 MHz band and a second 20 MHz band, which is continuously adjacent to the first channel. Alternatively, the SIG B field may be configured such that control information transmitted in a first 20 MHz band is duplicated and the duplicated control information is transmitted in a second 20 MHz band.

In this case, the SIG B field transmitted in the first band may include resource allocation information for data to be transmitted in the second band.

The resource allocation information may include first resource allocation information indicating resources to be used for transmitting the data on a chunk basis corresponding to 242 tones. In addition, the resource allocation information may further include second resource allocation information indicating resources allocated to each of the one or more STAs within a chunk corresponding the 242 tones that carries the resources to be used for transmitting the data.

The resource allocation information may include at least one of a chunk index, the number of chunks, a start chunk index, and resource configuration information It is preferred to set a time domain length of the SIG B field in the first band to be equal to that of the SIG B field in the second band.

To this end, it is preferred to determine the number of STAs that receive the allocated resources through the SIG B field in each of the first and second bands by considering the time domain length of the SIG B field in each of the first and second bands.

In a second aspect of the present invention, provided herein is a method of performing a random access, a method of receiving resource allocation information for data reception from an access point (AP) by a station (STA) in a wireless local area network (WLAN) system, including receiving a frame including a signaling field and a data field from the AP, wherein the signaling field may include a first signaling field (SIG A field) including first common control information for one or more STAs including the STA and a second signaling field (SIG B field) including individual control information for each of the one or more STAs, wherein the SIG B field may include resource allocation information for data transmission to the one or more STAs, and wherein the resource allocation information may include resource allocation information for data to be transmitted in a frequency band different from that used for transmitting the SIG B field.

In this case, the SIG B field may be configured such that independent control information is included in a first 20 MHz band and a second 20 MHz band, which is continuously adjacent to the first band. Alternatively, the SIG B field may be configured such that control information included in a first 20 MHz band is duplicated and the duplicated control information is included in a second 20 MHz band.

Further, the SIG B field included in the first channel may include resource allocation information for data to be received through the second channel.

In a third aspect of the present invention, provided herein is an access point (AP) device for transmitting resource allocation information for data transmission to one or more stations (STAs) in a wireless local area network (WLAN) system, including: a transceiver configured to transmit and receive signals to and from the one or more STAs; and a processor connected to the transceiver and configured to transmit a frame including a signaling field and a data field to the one or more STAs through the transceiver, wherein the signaling field may include a first signaling field (SIG A field) including first common control information for the one or more STAs and a second signaling field (SIG B field) including individual control information for each of the one or more STAs, wherein the SIG B field may include the resource allocation information for the data transmission to the one or more STAs, and wherein the resource allocation information may include resource allocation information for data to be transmitted in a frequency band different from that used for transmitting the SIG B field.

In a fourth aspect of the present invention, provided herein is a station (STA) device for receiving resource allocation information for data reception from an access point (AP) in a wireless local area network (WLAN) system, including: a transceiver configured to transmit and receive signals to and from the AP; and a processor connected to the transceiver and configured to receive a frame including a signaling field and a data field from the AP through the transceiver, wherein the signaling field may include a first signaling field (SIG A field) including first common control information for one or more STAs including the STA and a second signaling field (SIG B field) including individual control information for each of the one or more STAs, wherein the SIG B field may include resource allocation information for data transmission to the one or more STAs, and wherein the resource allocation information may include resource allocation information for data to be transmitted in a frequency band different from that used for transmitting the SIG B field.

Advantageous Effects

According to an embodiment of the present invention, it is possible to flexibly configure a channel for carrying resource allocation information and a channel for carrying resources allocated for data transmission in a transmission bandwidth for a multi-user frame. Thus, resource allocation loads can be efficiently distributed over channels and fields for carrying the resource allocation information can also be easily arranged between channels.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

FIGS. 14 to 16 are diagrams illustrating an MAC frame format.

BEST MODE FOR INVENTION

Figure 1:
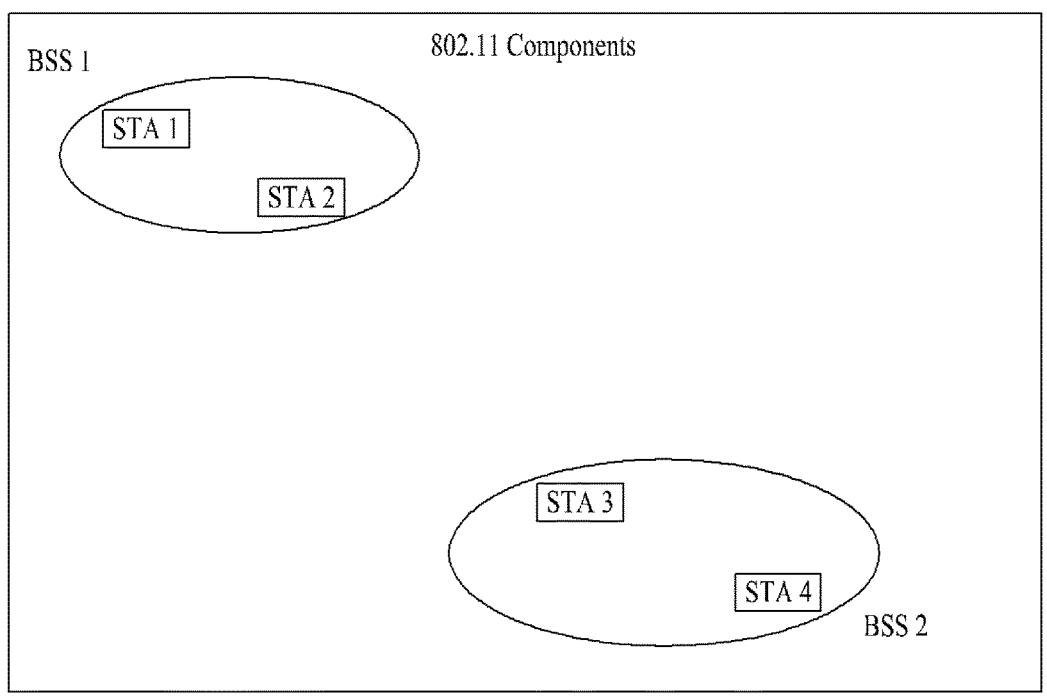
FIG. 1 is a diagram illustrating an exemplary configuration of a Wireless Local Area Network (WLAN) system.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of radio access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following technologies can be applied to a variety of radio access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as wireless (or radio) technology such as UTRA (Universal Terrestrial Radio Access) or CDMA2000. TDMA may be embodied as wireless (or radio) technology such as GSM (Global System for Mobile communications)/GPRS (General Packet Radio Service)/EDGE (Enhanced Data Rates for GSM Evolution). OFDMA may be embodied as wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA).

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

In the entire specification, when a certain portion "includes" a certain component, this indicates that the other components are not excluded, but may be further included unless specially described. The terms "unit", "- or/er" and "module" described in the specification indicate a unit for processing at least one function or operation, which may be implemented by hardware, software and a combination thereof.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
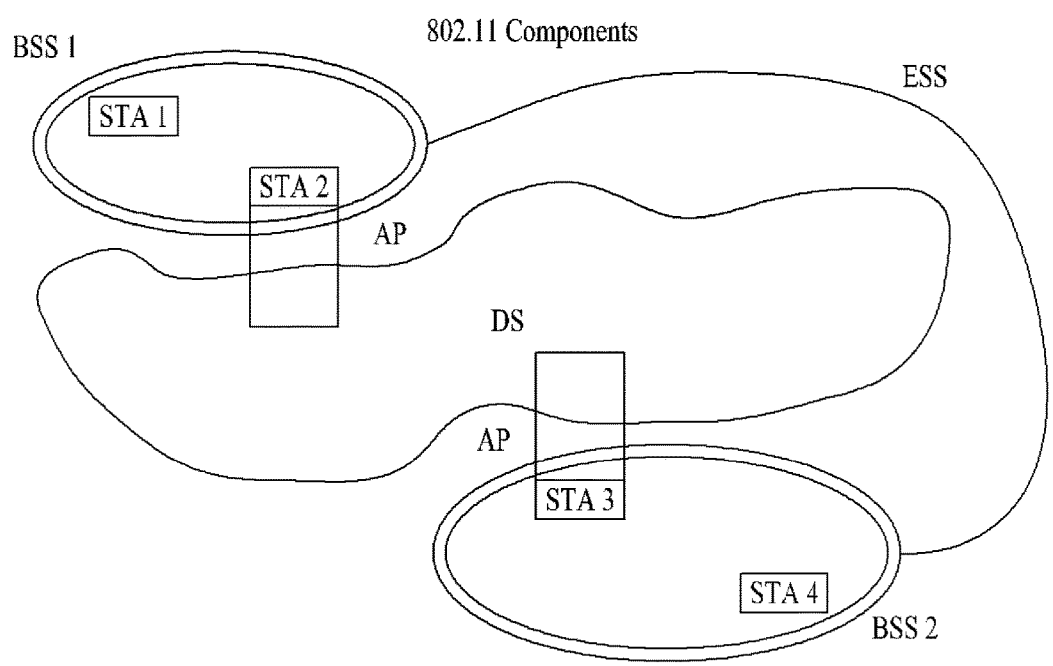
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Figure 3:
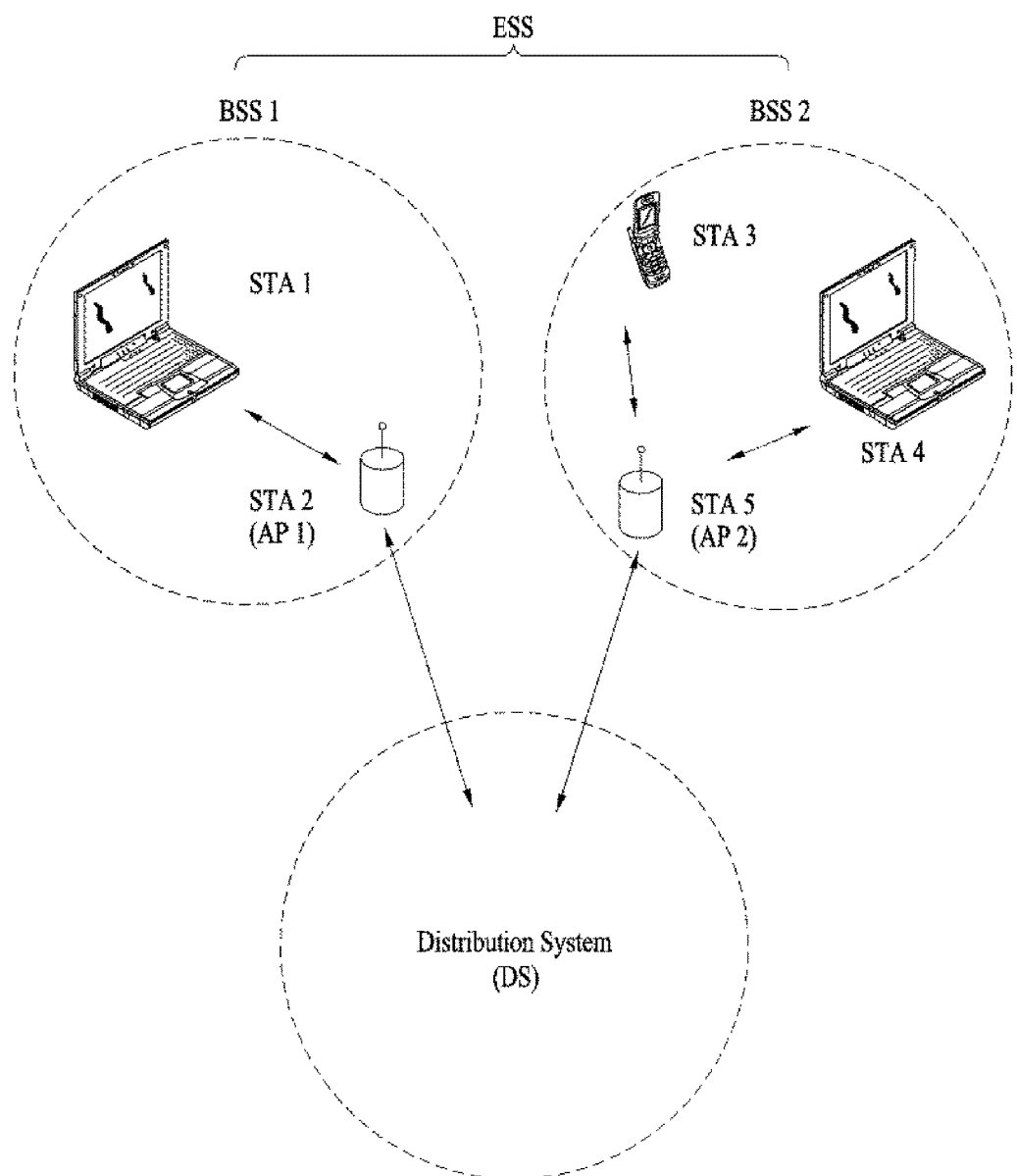
FIG. 3 is a diagram illustrating an exemplary structure of a WLAN system.

FIG. 3 is a diagram illustrating an exemplary structure of a WLAN system. FIG. 3 shows an example of an infrastructure BSS including a DS.

In the example of FIG. 3, BSS1 and BSS2 configure an ESS. In the WLAN system, a station operates according to MAC/PHY rules of IEEE 802.11. The station includes an AP station and a non-AP station. The non-AP station corresponds to an apparatus directly handled by a user, such as a laptop or a mobile telephone. In the example of FIG. 3, a station 1, a station 3 and a station 4 are non-AP stations and a station 2 and a station 5 are AP stations.

In the following description, the non-AP station may be referred to as a terminal, a wireless transmit/receive unit (WTRU), a user equipment (UE), a mobile station (MS), a mobile terminal, a mobile subscriber station (MSS), etc. In addition, the AP corresponds to a base station (BS), a node-B, an evolved node-B (eNB), a base transceiver system (BTS), a femto BS, etc. in different wireless communication fields.

Figure 4:
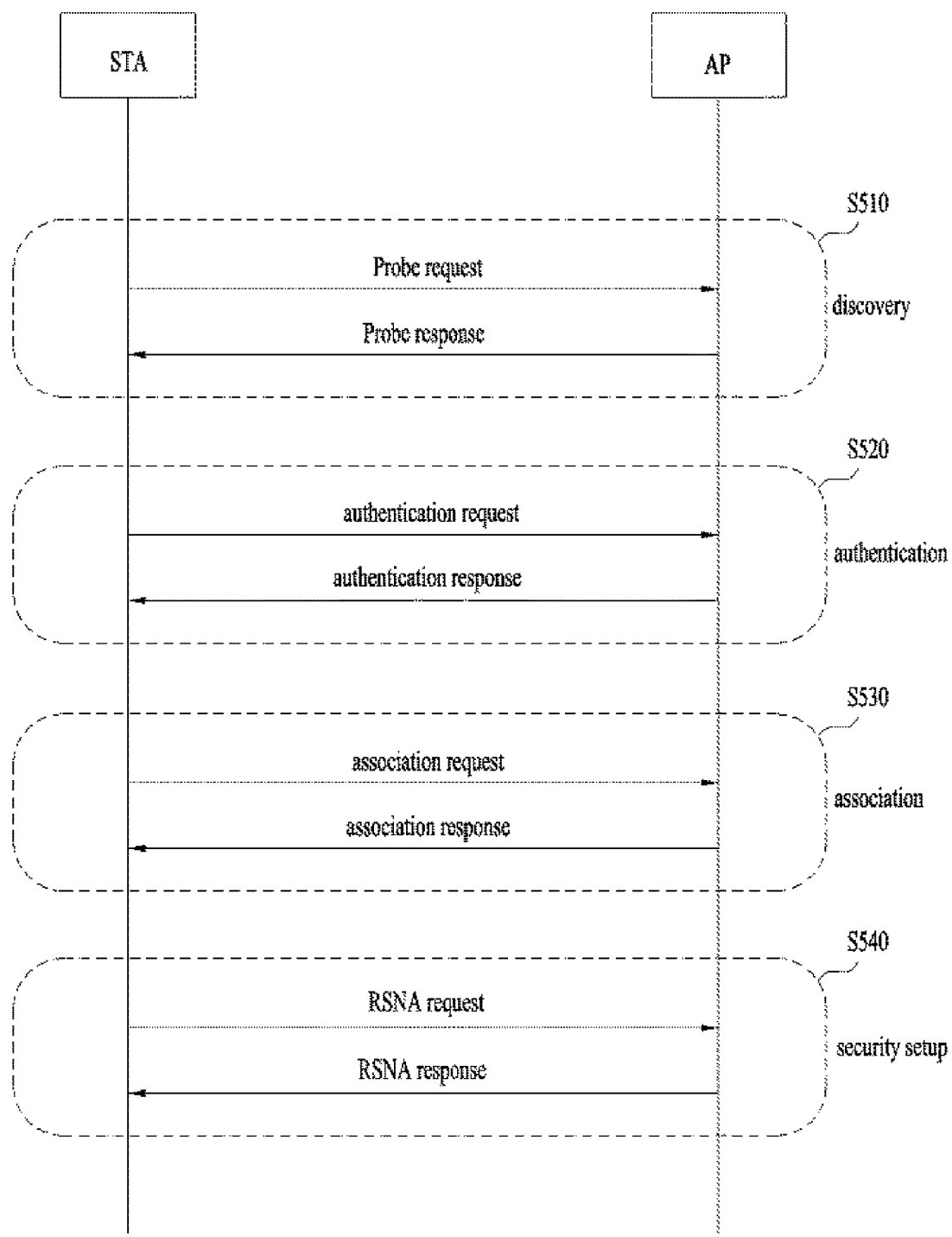
FIG. 4 is a diagram for explaining a general link setup process.
Figure 5:
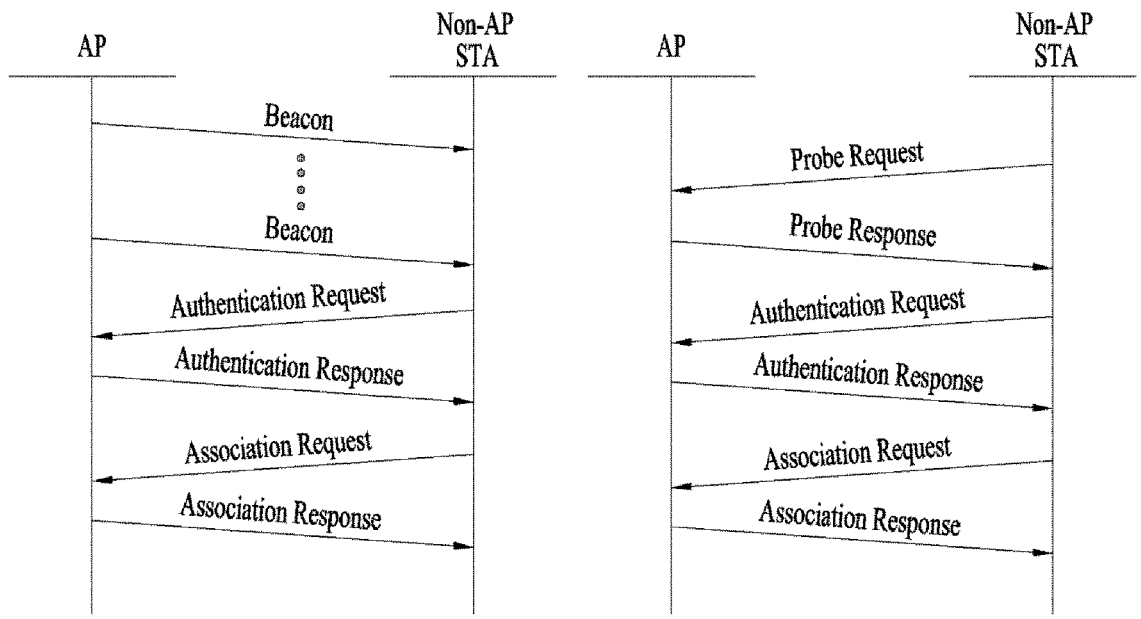
FIG. 5 is a diagram for explaining active scanning and passive scanning methods.

FIG. 4 is a diagram for explaining a general link setup process and FIG. 5 is a diagram for explaining active scanning and passive scanning methods.

To establish a link with a network and perform data transmission and reception, an STA discovers the network, performs authentication, establishes association and performs an authentication process for security. The link setup process may be referred to as a session initiation process or a session setup process. In addition, discovery, authentication, association and security setup of the link setup process may be collectively referred to as an association process.

An exemplary link setup process will be described with reference to FIG. 4.

In step S410, the STA may perform a network discovery operation. The network discovery operation may include a scanning operation of the STA. That is, the STA discovers the network in order to access the network. The STA should identify a compatible network before participating in a wireless network and a process of identifying a network present in a specific area is referred to as scanning.

The scanning method includes an active scanning method and a passive scanning method. Although FIG. 4 shows a network discovery operation including an active scanning process, the network discovery operation can be performed through a passive scanning process.

In active scanning, the STA which performs scanning transmits a probe request frame while moving between channels and waits for a response thereto, in order to detect which AP is present. A responder transmits a probe response frame to the STA, which transmitted the probe request frame, as a response to the probe request frame. The responder may be an STA which lastly transmitted a beacon frame in a BSS of a scanned channel. In the BSS, since the AP transmits the beacon frame, the AP is the responder. In the IBSS, since the STAs in the IBSS alternately transmit the beacon frame, the responder is not fixed. For example, the STA which transmits the probe request frame on a first channel and receives the probe response frame on the first channel stores BSS related information included in the received probe response frame, moves to a next channel (e.g., a second channel) and performs scanning (probe request/response transmission/reception on the second channel) using the same method.

In addition, referring to FIG. 5, a scanning operation may be performed using a passive scanning method. In passive scanning, the STA which performs scanning waits for a beacon frame while moving between channels. The beacon frame is a management frame in IEEE 802.11 and is periodically transmitted in order to indicate presence of a wireless network and to enable the STA, which performs scanning, to discover and participate in the wireless network. In the BSS, the AP is responsible for periodically transmitting the beacon frame. In the IBSS, the STAs alternately transmit the beacon frame. The STA which performs scanning receives the beacon frame, stores information about the BSS included in the beacon frame, and records beacon frame information of each channel while moving to another channel. The STA which receives the beacon frame may store BSS related information included in the received beacon frame, move to a next channel, and perform scanning on the next channel using the same method.

Compared to the passive scanning, the active scanning has a small delay and less power consumption.

After the STA has discovered the network, an authentication process may be performed in step S420. Such an authentication process may be referred to as a first authentication process to be distinguished from a security setup operation of step S440, which will be described later.

The authentication process includes the following processes. The STA transmits an authentication request frame to the AP and then, the AP transmits an authentication response frame to the STA in response to the authentication request frame. The authentication frame used for authentication request/response corresponds to a management frame.

The authentication frame may include information on an authentication algorithm number, an authentication transaction sequence number, a status code, a challenge text, a robust security network (RSN), a finite cyclic group, etc. Such information is merely an example of information included in the authentication request/response frame and can be replaced with different information. Moreover, additional information may be further included.

The STA may transmit the authentication request frame to the AP. The AP may determine whether authentication of the STA is allowed, based on the information included in the received authentication request frame. The AP may provide the STA with the authentication result through the authentication response frame.

After the STA is successfully authenticated, an association process may be performed in step S430. The association process includes the following processes. The STA transmits an association request frame to the AP and the AP transmits an association response frame to the STA in response thereto.

For example, the association request frame may include information on a variety of capabilities, beacon listen interval, service set identifier (SSID), supported rates, RSN, mobility domain, supported operating classes, traffic indication map (TIM) broadcast request, interworking service capability, etc.

For example, the association response frame may include information on a variety of capabilities, status code, association ID (AID), supported rates, enhanced distributed channel access (EDCA) parameter set, received channel power indicator (RCPI), received signal to noise indicator (RSNI), mobility domain, timeout interval (association comeback time), overlapping BSS scan parameter, TIM broadcast response, QoS map, etc.

This information is merely an example of information included in the association request/response frame and may be replaced with different information. Moreover, additional information may be further included.

After the STA is successfully associated with the network, a security setup process may be performed in step S540. The security setup process of step S440 may be referred to as an authentication process through a robust security network association (RSNA) request/response. In addition, the authentication process of step S520 may be referred to as the first authentication process and the security setup process of step S540 may be simply referred to as an authentication process.

The security setup process of step S440 may include a private key setup process through 4-way handshaking of an extensible authentication protocol over LAN (EAPOL) frame. In addition, the security setup process may be performed according to a security method which is not defined in the IEEE 802.11 standard.

Figure 6:
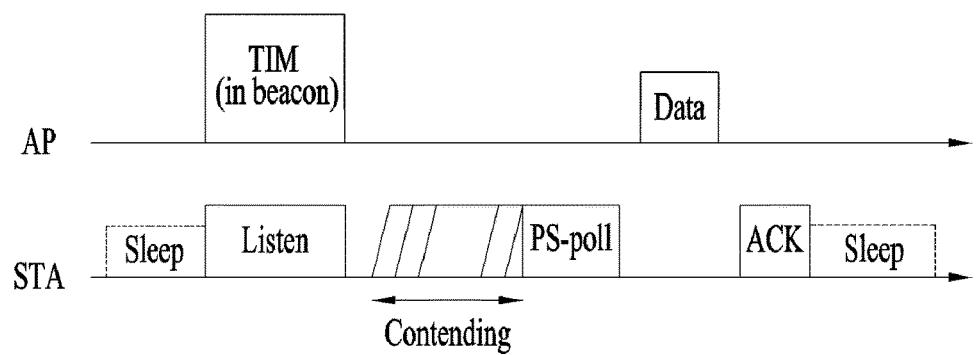
FIGS. 6 to 8 are diagrams for explaining detailed operations of a station that receives TIM.
Figure 7:
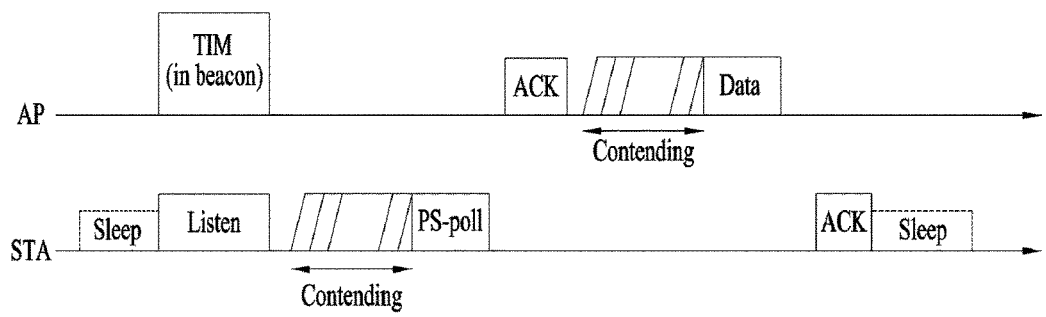
Figure 8:
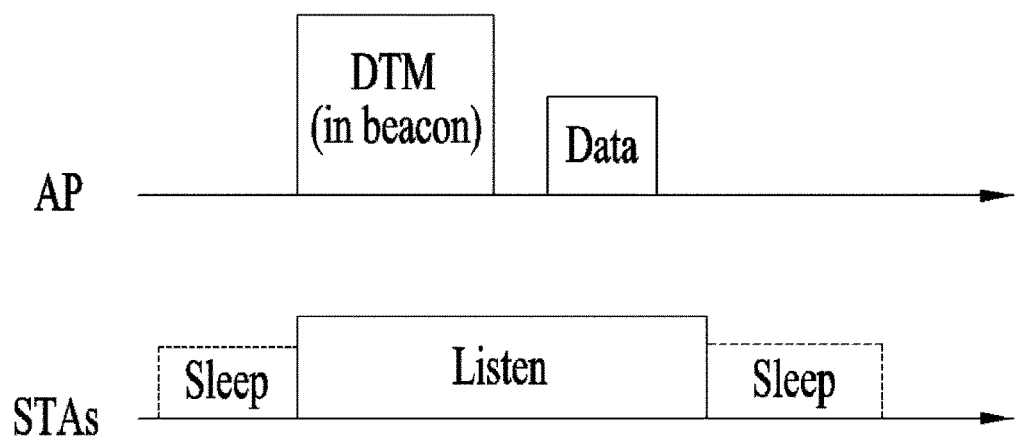
Figure 9:
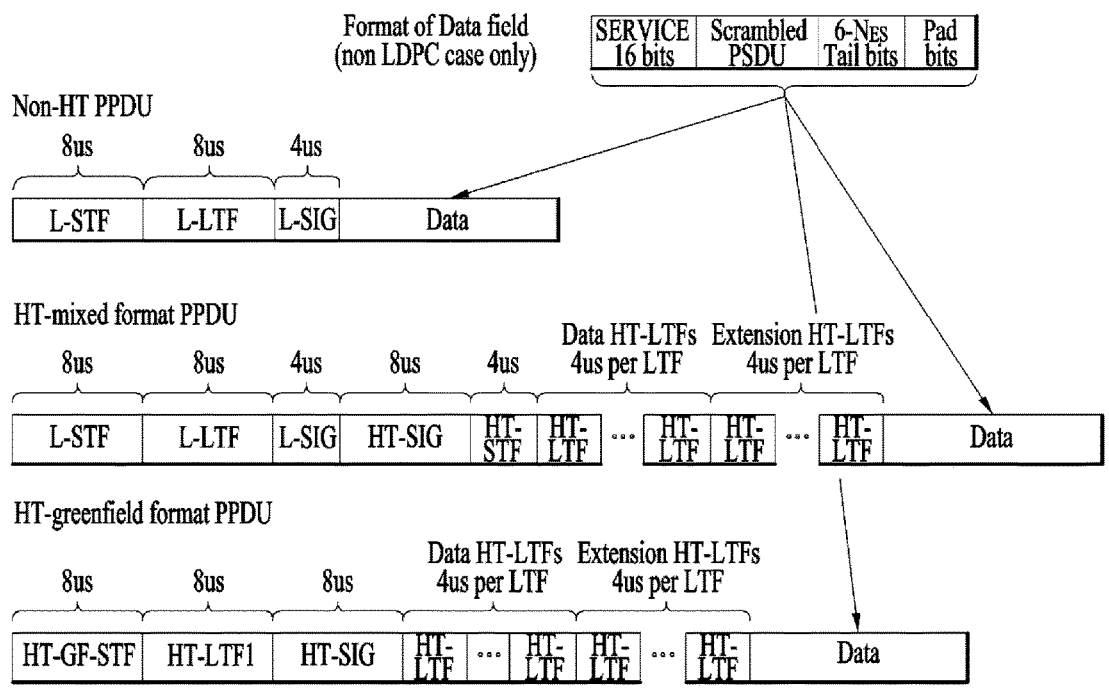
FIGS. 9 to 13 are diagrams for explaining an exemplary frame structure used in an IEEE 802.11 system.

FIGS. 6 to 8 are diagrams for explaining detailed operations of a station that receives TIM.

Referring to FIG. 6, an STA may switch from a sleep state to an awake state in order to receive a beacon frame including a traffic indication map (TIM) from an AP and interpret the received TIM element to confirm that buffered traffic to be transmitted thereto is present. The STA may contend with other STAs for medium access for transmitting a PS-Poll frame and then transmit the PS-Poll frame in order to request data frame transmission from the AP. The AP which receives the PS-Poll frame transmitted by the STA may transmit the frame to the STA. The STA may receive the data frame and transmit an ACK frame to the AP. Thereafter, the STA may be switched to the sleep state again.

As shown in FIG. 6, the AP may receive the PS-Poll frame from the STA and then operate according to an immediate response method in which a data frame is transmitted after a predetermined time (e.g., a short inter-frame space (SIFS)). If the AP does not prepare a data frame to be transmitted to the STA during the SIFS after receiving the PS-Poll frame, the AP may operate according to a deferred response method, which will be described with reference to FIG. 7.

In the example of FIG. 7, the STA operation for switching from the sleep state to the awake state, receiving the TIM from the AP, transmitting the PS-Poll frame to the AP through contention is the same as that of FIG. 6. If the AP does not prepare the data frame during the SIFS after receiving the PS-Poll frame, the AP may transmit the ACK frame to the STA instead of the data frame. If the AP prepares the data frame after transmitting the ACK frame, the AP may transmit the data frame to the STA through the contention. The STA may transmit the ACK frame indicating that the data frame has been successfully received to the AP and may be switched to the sleep state.

FIG. 8 shows an example in which the AP transmits a DTIM. STAs may be switched from the sleep state to the awake state to receive a beacon frame including the DTIM element from the AP. The STAs may confirm that a multicast/broadcast frame will be transmitted through the received DTIM. The AP may immediately transmit data (that is, the multicast/broadcast frame) without PS-Poll frame transmission and reception after transmitting the beacon frame including the DTIM. The STAs may receive data in the awake state after receiving the beacon frame including the DTIM and then be switched to the sleep state again after completing data reception.

FIGS. 9 to 13 are diagrams for explaining an exemplary frame structure used in an IEEE 802.11 system.

An STA may receive a physical layer convergence protocol (PLCP) packet data unit (PPDU). In this case, a PPDU frame format may include a short training field (STF), a long training field (LTF), a signal (SIG) field, and a data field. In this case, for example, the PPDU frame format may be configured based on a type of the PPDU frame format.

For instance, a non-HT (high throughput) PPDU frame format may be composed of a legacy-STF (L-STF), a legacy-LTF (L-LTF), a SIG field, and a data field only.

In addition, the type of the PPDU frame format may be configured as one of an HT-mixed format PPDU and an HT-greenfield format PPDU. In this case, an additional (or different types of) STF, LTF and SIG field may be further included between the SIG field and the data field in the PPDU format.

Figure 10:
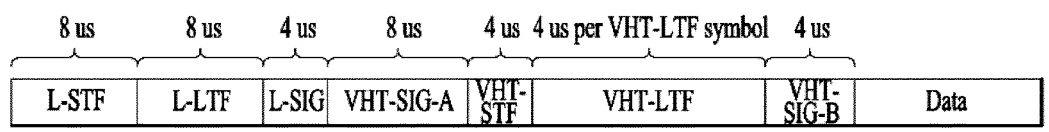

Referring to FIG. 10, a very high throughput (VHT) PPDU format can be configured. In this case, an additional (or different types of) STF, LTF, and SIG field may be included between an SIG field and a data field in the VHT PPDU format. In more detail, at least one of a VHT-SIG-A field, a VHT-STF, a VHT-LTF, and a VHT SIG-B field may be included between an L-SIG field and the data field in the VHT PPDU format.

In this case, the STF may be a signal for signal detection, automatic gain control (AGC), diversity selection, accurate time synchronization, etc. In addition, the LTF may be a signal for channel estimation, frequency error estimation, etc. A combination of the STF and the LTF may be referred to as a PLCP preamble and the PLCP preamble may be a signal for synchronization and channel estimation in an OFDM physical layer.

Figure 11:
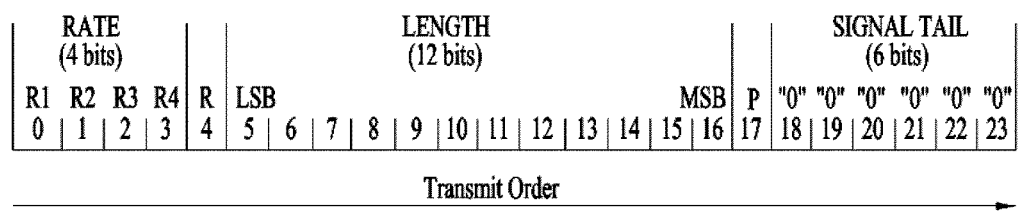

Referring to FIG. 11, the SIG field may include a RATE field, a LENGTH field, etc. The RATE field may contain information on data modulation and coding rate. The LENGTH field may contain information on a data length. Additionally, the SIG field may include a parity field, a SIG TAIL bit, etc.

The data field may include a SERVICE field, a PLCP service data unit (PSDU), and a PPDU TAIL bit. If necessary, the data field may further include a padding bit.

Figures 12, 13:
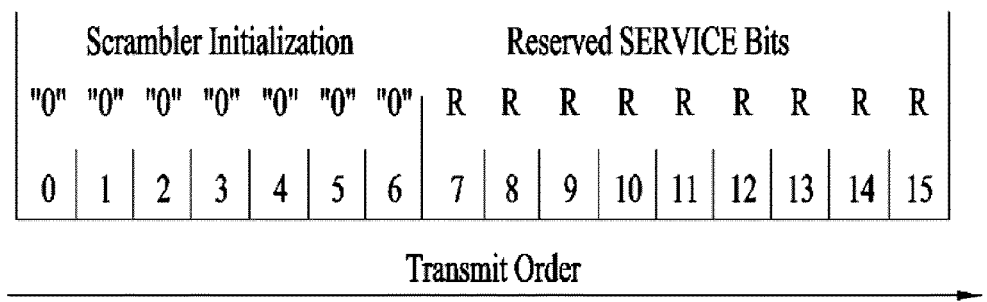

Referring to FIG. 12, some bits of the SERVICE field may be used to synchronize a descrambler at a receiving end and some other bits may be set to reserved bits. The PSDU may correspond to a MAC protocol data unit (PDU) defined in a MAC layer and include data generated/used in a higher layer. The PPDU TAIL bit may be used to return an in a zero state. The padding bit may be used to adjust a length of the data field according to a predetermined unit.

In addition, the VHT PPDU format may further include the additional (or different types of) STF, LTF, and SIG field as described above. In this case, the L-STF, L-LTF, and L-SIG field may belong to a non-VHT part of the VHT PPDU format and the VHT-SIG-A field, VHT-STF, VHT-LTF, and VHT-SIG-B field may belong to a VHT part of the VHT PPDU format. In other words, the VHT PPDU may separately have a region for non-VHT fields and a region for VHT fields. For example, the VHT-SIG-A field may include information for interpreting the VHT PPDU.

Referring to FIG. 13, the VHT-SIG-A may include a VHT SIG-A1 (shown in FIG. 13 (a)) and a VHT SIG-A2 (shown in FIG. 13 (b)). Each of the VHT SIG-A1 and the VHT SIG-A2 may be configured with 24 bits and the VHT SIG-A1 may be transmitted prior to the VHT SIG-A2. The VHT SIG-A1 may include BW, STBC, Group ID, NSTS/Partial AID, TXOP_PS_NOT_ALLOWED, and Reserved fields and the VHT SIG-A2 may include Short GI, Short GI NSYM Disambiguation, SU/MU[0] Coding, LDPC Extra OFDM Symbol, SU VHT-MCS/MU[1-3] Coding, Beamformed, CRC, Tail, and Reserved fields. The above-mentioned fields may be used to check information on the VHT PPDU.

Figure 14:
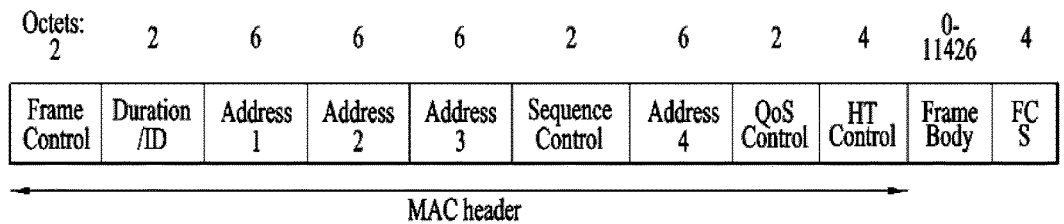
Figure 15:
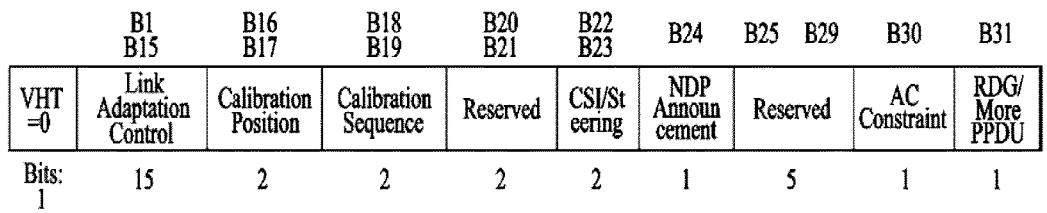
Figure 15:
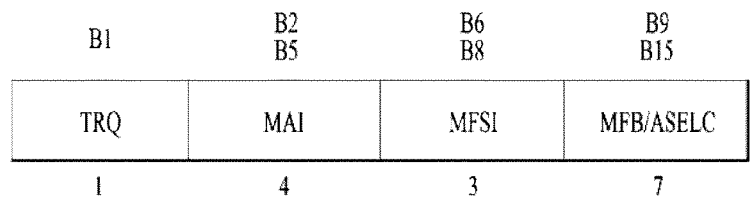

FIGS. 14 to 16 are diagrams illustrating an MAC frame format.

An STA can receive a PPDU having one of the aforementioned PPDU formats. In this case, the MAC PDU may be included in the PSDU of the data part in the PPDU frame format. The MAC PDU is defined by various MAC frame formats and a basic MAC frame may be composed of a MAC header, a frame body, and a frame check sequence (FCS).

Referring FIG. 14, the MAC header may include a frame control field, a duration/ID field, an address field, a sequence control subfield, a QoS control subfield, a HT control subfield, etc. In this case, the frame control field of the MAC header may contain control information necessary for frame transmission/reception. In addition, the duration/ID field may include a time required for transmitting a corresponding frame. Moreover, the address field may include identification information of a transmitter and a receiver. Details of the address field will be described later. Additionally, details of the sequence control, QoS control, and HT control fields could be found in the IEEE 802.11 standards.

The HT control field may have two forms: an HT variant and a VHT variant. Information contained in the HT control field may differ according to each form. In addition, referring to FIGS. 15 and 16, a VHT subfield of the HT control field may indicate whether the HT control field is the HT variant of the VHT variant. For example, if the VHT subfield is set to '0', the HT control field may be the HT variant. On the contrary, if the VHT subfield is set to '1', the HT control field may be the VHT variant.

Referring to FIG. 15, for example, if the HT control field is the HT variant, the HT control field may include Link Adaptation Control, Calibration Position, Calibration Sequence, CSI/Steering, HT NDP Announcement, AC constraint, RDG/More PPDU, and Reserved fields. Referring to FIG. 15(b), for example, the Link Adaptation Control field may include TRQ, MAI, MFSI, and MFB/ASELC fields. Details could be found in the IEEE 802.11 standards.

Referring to FIG. 16, for example, if the HT control field is the VHT variant, the HT control field may include MRQ, MSI, MFSI/GID-LM, MFB GID-H, Coding Type, FB Tx Type, FB Tx Type, Unsolicited MFB, AC constraint, RDG/More PPDU and Reserved fields. Referring to FIG. 16(b), for example, the MFB field may include VHT N_STS, MCS, BW, and SNR fields.

Figures 17, 18:
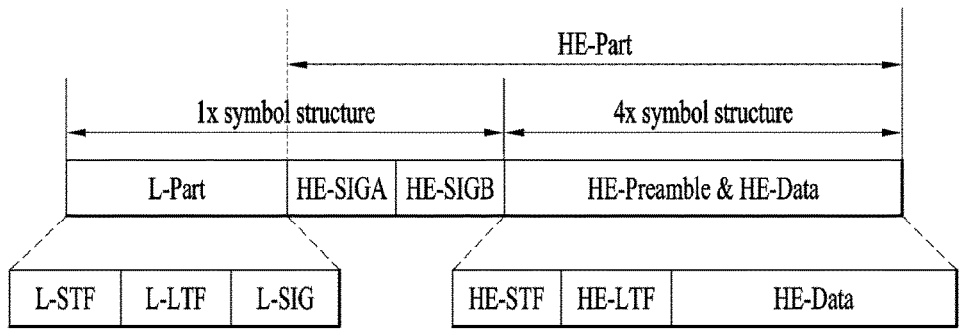
FIG. 17 is a diagram illustrating a short MAC frame format.
FIG. 18 is a diagram illustrating an exemplary high-efficiency (HE) PPDU format according to an embodiment of the present invention.

FIG. 17 is a diagram illustrating a short MAC frame format. A MAC frame may be configured in the form of a short MAC frame to reduce unnecessary information under circumstances of necessity and thus save radio resources. Referring to FIG. 17, for example, a MAC header of the short frame may include a frame control field, an A1 field, and an A2 field which are mandatory. The MAC header of the short frame may further include a sequence control field, an A3 field, and an A4 field which are optional. By doing so, unnecessary information may be excluded from the MAC frame, thereby preventing waste of radio resources.

For example, the frame control field of the MAC header may include Protocol Version, Type, PTID/Subtype, From DS, More Fragment, Power Management, More Data, Protected Frame, End of Service Period, Relayed Frame, and Ack Policy fields. Details of each subfield of the frame control field could be found in the IEEE 802.11 standards.

Meanwhile, the Type field of the frame control field in the MAC header may be implemented with 3 bits. Each of values 0 to 3 of the Type field may provide address information and values 4 to 7 of the Type field may be reserved. In this regard, the reserved values may be used to indicate new address information in the present invention, which will be described later.

The From DS field of the control frame field in the MAC header may be implemented with 1 bit.

Each of other fields, i.e., the More Fragment, Power Management, More Data, Protected Frame, End of Service Period, Relayed Frame, and Ack Policy fields may be implemented with 1 bit. The Ack Policy field may provide ACK/NACK information using 1 bit.

Regarding STAs including the above-described frames, an AP VHT STA may support a non-AP VHT STA operating in transmit opportunity (TXOP) power save mode in a single BSS. In this case, for example, the non-AP VHT STA may operate in the TXOP power save mode as an active state. The AP VHT STA may switch the non-AP VHT STA to a doze state during a TXOP. For example, the AP VHT STA may instruct the non-AP VHT STA to switch to the doze state by setting a TXVECTOR parameter, TXOP_PS_NOT_ALLOWED to 0 and transmitting a VHT PPDU. Parameters in the TXVECTOR, which are transmitted together with the VHT PPDU from the AP VHT STA, may be changed from 1 to 0 and then be maintained as 0 during the TXOP. By doing so, power may be saved during the remaining TXOP.

On the contrary, if TXOP_PS_NOT_ALLOWED is set to 1 and power saving is not performed, the parameters in the TXVECTOR may be kept unchanged.

As described above, for example, the non-AP VHT STA may be switched to the doze state during the TXOP in the TXOP power save mode if any of the following conditions is satisfied:

A case in which the STA receives a VHT MU PPDU and is not designated as a member of a group indicated by an RXVECTOR parameter, group_ID;

A case in which the STA receives an SU PPDU and an RXVECTOR parameter, PARTIAL_AID is not 0 or does not match the partial_AID of the STA;

A case in which the STA determines that the RXVECTOR parameter, PARTIAL_AID matches the partial AID of the STA but a receiver address included in the MAC header does not match a MAC address of the STA;

A case in which the STA is designated as a member of the group indicated by the RXVECTOR parameter, group_ID but an RXVECTOR parameter, NUM_STS is set to 0;

A case in which the STA receives a VHT NDP announcement frame, and the RXVECTOR parameter, PARTIAL_AID is set to 0 and does not match an AID include in the Info field of the STA; and A case in which the STA receives a frame having a More Data field set to 0 and an Ack Policy subfield set to No Ack, or transmits ACK when the Ack Policy subfield is set to a value rather than No Ack.

In this case, the AP VHT STA may include a Duration/ID value corresponding to a remaining TXOP period and a NAV-SET Sequence (e.g., RTS/CTS). The AP VHT STA may not transmit a frame to a non-AP VHT STA that transitions to the doze state, based on the above conditions during the remaining TXOP.

For example, if the AP VHT STA sets the TXVECTOR parameter, TXOP_PS_NOT_ALLOWED to 0 and transmits the VHT PPDU along with the TXVECTOR parameter during the same TXOP, and the STA does not desire to switch from the active state to the doze state, the AP VHT STA may not transmit a VHT SU PPDU.

In addition, for example, before expiration of a NAV which is set when a TXOP starts, the AP VHT STA may not transmit a frame to a VHT STA that has transitioned to the doze state.

In this case, if the AP VHT STA fails to receive ACK after transmitting a frame including at least one of an MSDU, an A-MSDU, and an MMPDU when the More Data field is set to 0, the AP VHT STA may retransmit the frame at least once during the same TXOP. Moreover, if the AP VHT STA fails to receive ACK for the retransmission in the last frame of the same TXOP, the AP VHT STA may retransmit the frame after waiting for a next TXOP.

Moreover, for example, the AP VHT STA may receive a BlockAck frame from a VHT STA operating in the TXOP power save mode. The BlockAck frame may be a response to an A-MPDU including an MPDU with the More Data field set to 0. In this case, since the AP VHT STA is in the doze state, the AP VHT STA may not receive a response to a subsequence of a retransmitted MPDU during the same TXOP.

Furthermore, a VHT STA, which has operated in the TXOP power save mode and transitioned to the doze state, may be configured to run a NAV timer in the doze state. For example, the VHT STA may transition to the awake state after expiration of the timer.

Further, the STA may also initiate contention for medium access after expiration of the NAV timer.

HE PPDU

A frame structure for the IEEE 802.11ax has not been defined but it is expected that the frame structure may be similar to the following structure.

FIG. 18 is a diagram illustrating an exemplary high-efficiency (HE) PPDU format according to an embodiment of the present invention.

According to the 11ax standards, it is possible to use a frame structure where a conventional 1× symbol structure (i.e., 3.2 us) is maintained until an HE-SIGB, and a 4× symbol structure (i.e., 12.8 us) is used for an HE-preamble and data part as shown in FIG. 18. In an L-part, the L-STF, L-LTF, and L-SIG are maintained similar to a configuration of the conventional Wi-Fi system. In this case, the L-SIG is used to transmit packet length information. Herein, an HE-part means a part newly defined in the 11ax standards (for high efficiency).

A signaling field in the HE-part, i.e., HE-SIG (HE-SIG A and HE-SIG B) may exist between the L-part and the HE-STF and be used to provide common control information and user-specific information. Specifically, the HE-SIG may include an HE-SIG A for carrying the common control information and an HE-SIG B for carrying the user-specific information.

Although details of HE-SIG information have not defined in the 11ax, the HE-SIG A and HE-SIG B may be used for transmitting the following information. Specifically, Table 1 shows information that can be included in the HE-SIG A and Table 2 shows information that can be included in the HE-SIG B.

TABLE 1

| FIELD | DESCRIPTION |
| --- | --- |
| Bandwidth | Indicating a bandwidth in which a PPDU is transmitted. For example, 20 MHz, 40 MHz, 80 MHz |
| Color bits | Indicating an BSS ID |
| MCS | Indicating the MCS of HE-SIGB |
| N_sym | Indicating the number of symbol for HE-SIG B |
| Guard Interval (GI) indication | Indicating the CP length of HE-SIGB (ex. 0.4, 0.8, 1.6, 2.4) |
| MU indication | Indicating whether a PPDU is an SU-MIMO PPDU or an MU-MIMO PPDU |

TABLE 2

| FIELD | DESCRIPTION |
| --- | --- |
| Partial AID | |
| MCS | Indicating the MCS of Data for each STA |
| Stream information | Indicating the number of spatial streams for each STA, |
| encoding | Indicating whether BCC or LDPC |
| beam formed | Indicating whether beam forming or not |
| Guard Interval (GI) indication | Indicating the CP length of Data for each STA |
| Allocation information | Indicating a resource block (subchannel index or subband index) allocated to each STA in a bandwidth in which a PPDU is transmitted |
| STBC | Space Time Block Coding |
| length | Indicating the length of HE PPDU is transmitted in a bandwidth |

The HE-SIG A and HE-SIG B including the above-described information are transmitted using the same transmission format (1× symbol structure) as that used for the legacy part, whereas the HE-STF, HE-LTF, and data part may be transmitted using the 4× symbol structure. In addition, in the HE-data part, various resource allocation blocks/chunks can be used for data transmission according to a bandwidth (BW).

Since the HE-SIG B and the data part are transmitted using the different symbol structures as described above, the HE-SIG B and the data part can also be transmitted using different transmission resources. In the embodiments of the present invention, proposed are methods for mapping a resource block for an HE-SIG B that carries resource allocation information for an STA and a resource block where actual data is transmitted.

Since the HE-SIG B, which contains the user-specific information, is transmitted using the 1× symbol structure, the HE-SIG B can be duplicated on a 20-MHz band basis and then transmitted over a wide bandwidth. Alternatively, independent information can be loaded and transmitted in each 20 MHz band. For example, when an STA/AP performs data transmission over an 80 MHz bandwidth, the HE-SIG B can be transmitted as described in the following embodiments.

Figure 19:
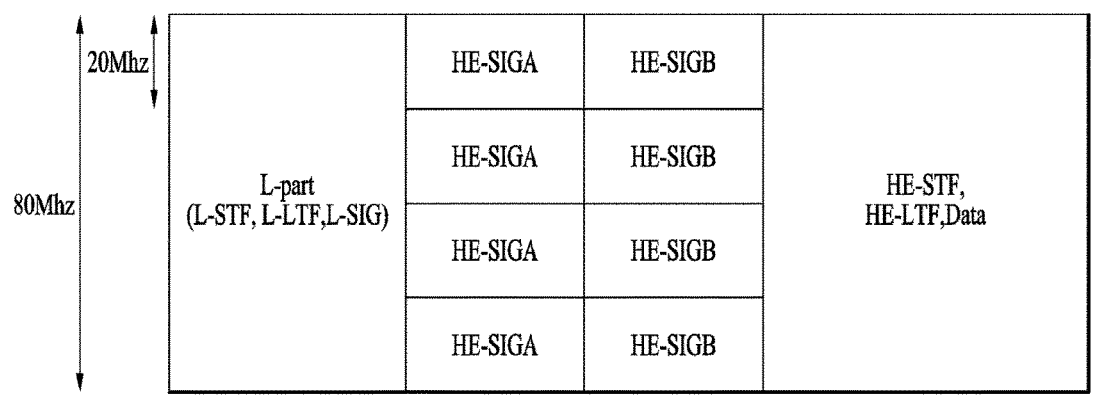
FIGS. 19 and 20 are diagrams for explaining a method for allocating resources when an HE-SIG B is transmitted repeatedly in each 20 MHz band.
Figure 20:
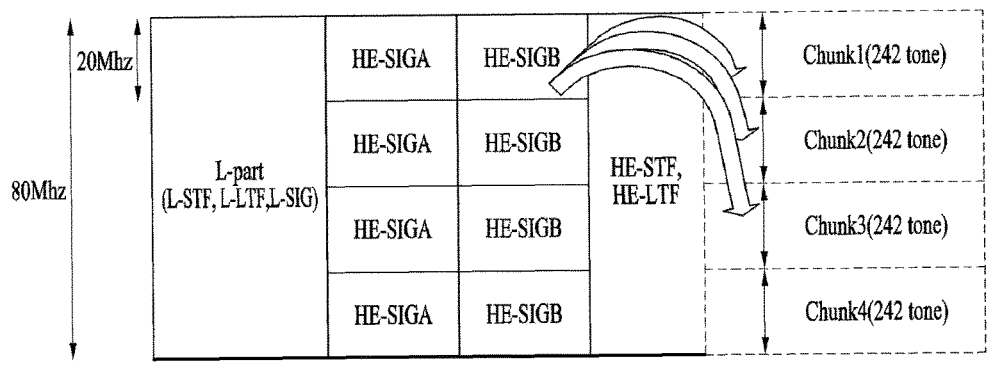

First Embodiment—A Case in which an HE SIG B is Repeatedly Transmitted in a Plurality of 20 MHz Bands FIGS. 19 and 20 are diagrams for explaining a method for allocating resources when an HE-SIG B is repeatedly transmitted in each 20 MHz band.

Specifically, it is assumed in FIGS. 19 and 20 that a 1× symbol structure of an HE-SIG B is duplicated on a 20-MHz basis and then transmitted in each 20 MHz. In this case, a data part may be configured on a resource-block basis (e.g., 26 tones, 242 tones, etc.).

According to this structure, information on a resource block for an STA, which is transmitted in the HE-SIG B, may be configured on a 20-MHz bandwidth basis (e.g., 242 chunks) in the 4× symbol structure where the HE-SIG B is transmitted.

In the following description, a chunk means a set of consecutive frequency tones. For example, 242 tones can be defined as a single chunk and in this case, the single chunk may approximately mean a 20 MHz BW. That is, in a 40 MHz BW, there are one chunk at each end of DC, i.e., a total of two chunks and in an 80 MHz BW, there are two chunks at each end of DC, i.e., a total of four chunks.

Based on the above discussion, indication in accordance with the number of STAs can be given as follows.

First, if the number of STAs that perform data transmission scheduling is one (i.e., in case of the SU), an STA may know whether a full band is used through an SU/MU indicator that is transmitted through an SIG_A. In addition, the STA may also check allocated resources through allocation information (e.g., a chunk index, the number of chunks, etc.) that is transmitted through an SIG_B.

If the number of STAs that perform data transmission scheduling is equal to or greater than two (i.e., in case of the MU), an STA may check resources allocated to itself through an AID/P-AID or allocation information (e.g., a chunk index, the number of chunks, etc.) in an SIG_B. In this case, one or more chunks may be allocated to a single STA.

If two or more chunks are allocated to a specific STA, an AP may transmit indices of all the allocated chunks. Alternatively, the AP may transmit an index of a start chunk and the number of chunks and thus, the STA may be continuously allocated chunks from the start chunk for transmission.

Referring to FIG. 20, considering resource allocation information transmitted in a certain 20 MHz band, it is possible to interpret that since the same control information is repeatedly transmitted through the HE-SIG B in each 20 MHz band, resource allocation is performed on a 242-chunk basis over a total 80 MHz band.

Unlike the above-mentioned embodiment where the resource allocation is performed on the 242-chunk basis corresponding to 20 MHz, the resource allocation information to be transmitted in the SIG_B may be transmitted in the following two ways. In the first way, the resource allocation information may be transmitted in the 242-chunk basis and in the second way, the resource allocation information may be transmitted to the STA using chunks (e.g., 26, 52, or 106 chunks), which are smaller than the corresponding chunks. In this case, a number of smaller chunks may be allocated for the STA.

Different from resources for transmitting the HE-SIG B, information on resources (chunks) for the STA transmitted through the HE-SIG B may be transmitted according to a chunk configuration defined for each bandwidth.

Figure 21:
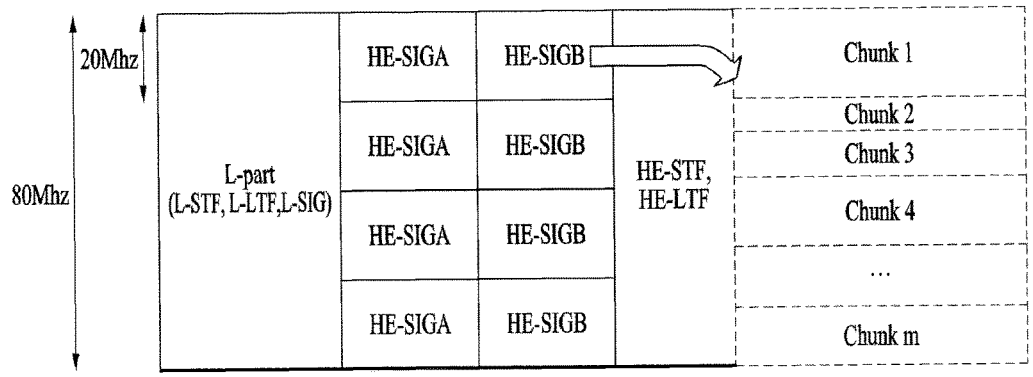
FIG. 21 is a diagram illustrating a case in which a data part is composed of various sizes of chunks according to an embodiment of the present invention.

FIG. 21 is a diagram illustrating a case in which a data part is composed of various sizes of chunks according to an embodiment of the present invention.

When the STA transmits data using the 80 MHz bandwidth, the 80 MHz bandwidth may be composed of various sizes of chunks (e.g., 26, 52, 106, 242, etc.) as shown in FIG. 21. Thus, the HE-SIG B is transmitted through signal duplication using the 20 MHz band. In this case, the resource allocation information for the STA included in the HE-SIG B may be configured according to chunk configuration information configured for each bandwidth.

Specifically, chunks (or resources) may be sequentially allocated to the STA using the chunk configuration information for each bandwidth. For example, when data is transmitted using the 80 MHz band, resources for data part may be configured using 242-chunk and 26-chunk and then allocated to the STA in configuration order. In this case, information transmitted through the SIG-B may include a chunk index, the number of chunks, a start index, a configuration, etc. In addition, the resources may be sequentially allocated according to chunk sizes. For example, the resources may be allocated in descending or ascending order of the chunk sizes.

As another method, the allocation information transmitted to the STA through the HE-SIG B may be configured such that based on bandwidths used for data transmission, chunks corresponding to small bandwidths (e.g., 20 MHz BW and 40 MHz BW) are firstly assorted and then different sizes of chunks (e.g., 26, 52, 106, 242, 484, etc.) among the assorted chunks are assorted.

Second Embodiment—A Case in which an HE SIG_B is Independently Transmitted in Each 20 MHz Band In the case of wide bandwidth, an HE-SIG B can be independently transmitted on a 20-MHz basis using the 1× symbol structure. In other words, the HE-SIG B can be transmitted on the 20-MHz basis and include information for a different STA in each band.

Figure 22:
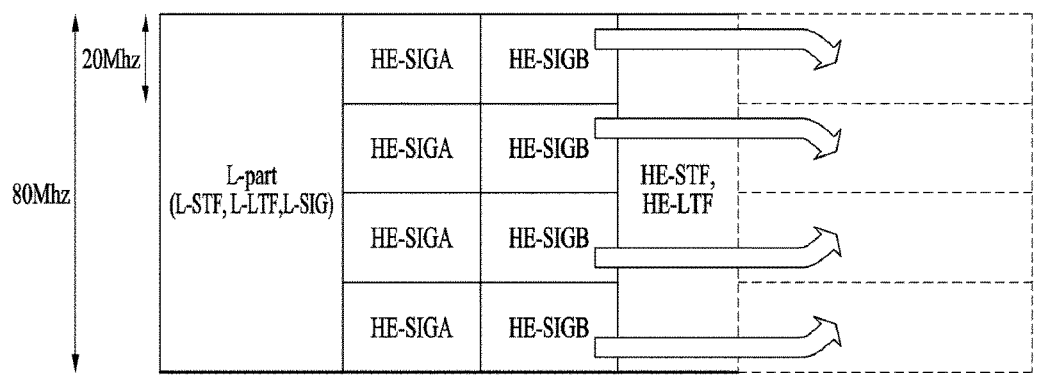
FIG. 22 is a diagram illustrating a case in which an independent HE-SIG B is transmitted in each 20 MHz band according to an embodiment of the present invention.

FIG. 22 is a diagram illustrating a case in which an independent HE-SIG B is transmitted in each 20 MHz band according to an embodiment of the present invention.

Assuming that a frame structure for the OFDMA, where a FFT size is increased by four times than the conventional one, is composed of chunks, it is possible to propose a method for transmitting resource allocation information for a chunk through an HE-SIG B corresponding to the chunk as shown in FIG. 22. That is, information on the corresponding resources may be transmitted through a 20 MHz band for transmitting the HE-SIG B as shown in FIG. 22. In this case, the allocation information, which will be transmitted to an STA, may be configured on the 242-chunk basis corresponding to 20 MHz or using different sizes of chunks within 20 MHz.

In other words, the allocation information for allowing STAs to perform transmission can be configured using chunks configured for each bandwidth. In this case, the HE-SIG B transmitted on the 20-MHz basis may include information regarding chunks allocated to the corresponding STAs only. In addition, the allocation information to be transmitted to the STAs may include a chunk index, a chunk configuration, a chunk size, the number of chunks, a start point, an end point, etc.

In this embodiment, it is assumed that data transmission resources are allocated for a band different from the 20 MHz band for transmitting the HE-SIG B unlike the above-mentioned embodiment. That is, it is possible to propose a method for transmitting resource allocation information for a chunk through a different HE-SIG B rather than an HE-SIG B corresponding to the chunk. Through the method, HE-SIG Bs for a plurality of 20 MHz bands can be easily arranged in the time domain.

Specifically, when an independent HE-SIG B is transmitted on the 20-MHz basis, the number of allocated STAs may be different in each chunk and the amount of resource allocation information for the HE-SIG B may also be different in each chunk. Thus, the HE-SIG B may have a different length.

To solve this, the numbers of allocation users per 20 MHz band HE-SIG B may be set to be equal to each other. That is, resource allocation may be performed irrespective of whether a data chunk is in 20 MHz of the HE-SIG B.

Figure 23:
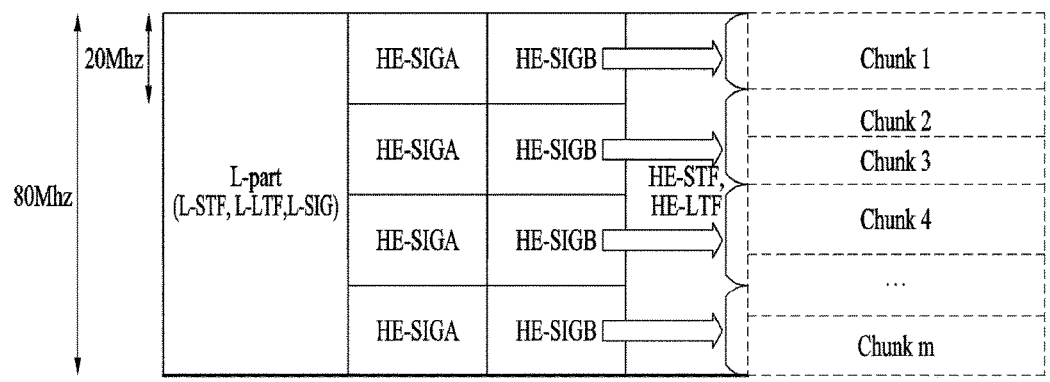
FIG. 23 is a diagram for explaining a method for performing resource allocation for an independent 20-MHz basis HE-SIG B regardless of its 20 MHz range according an embodiment of the present invention.

FIG. 23 is a diagram for explaining a method for performing resource allocation for an independent 20-MHz basis HE-SIG B regardless of its 20 MHz range according an embodiment of the present invention.

When an independent HE-SIG B is transmitted in each 20 MHz, resource allocation for HE-SIG B 1 may be performed with respect to a frequency domain chunk for transmission of HE-SIG B 2. Alternatively, it is possible to configure a different number of times of allocation on the premise that a HE-SIG B length is not changed. This may imply that STAs are flexibly allocated in a full band.

In addition, even when the number of users is different, a pattern may be configured such that HE-SIG B lengths are equal to each other. For example, when there are a number of users, a pattern of using a high-order MCS may be determined for the same length. In this case, transmission information for each HE-SIG B (i.e., information available for HE-SIG B decoding such as a pattern index, the number of users, an MCS, etc.) may be signaled through an HE-SIG_A.

Meanwhile, it is possible to configure a time-domain length between HE-SIG Bs through padding and fix the number of symbols for the HE-SIG B with reference to the maximum number of users.

Even when the HE-SIG B is transmitted independently, the HE-SIG B can be duplicated in the case of the SU except the MU. That is, in the case of the SU, the HE-SIG_B can be mandatorily duplicated and transmitted.

To this end, whether a corresponding frame is for either the SU or the MU can be signaled through the HE-SIG_A.

Third Embodiment—A Combination of the First and Second Embodiments

An HE-SIG B can be transmitted through a combination of the first embodiment in which transmission is repeatedly performed on the 20-MHz basis and the second embodiment in which independent information is transmitted on the 20-MHz basis.

Figure 24:
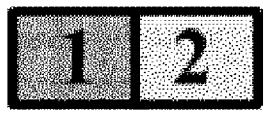
FIG. 24 is a diagram illustrating a case in which an HE-SIG B is transmitted according to an embodiment of the present invention.
Figure 24:
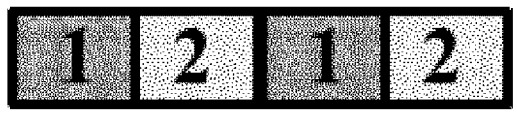
Figure 24:
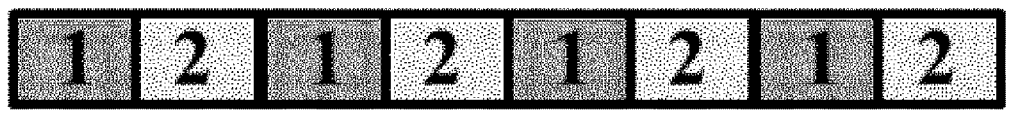

FIG. 24 is a diagram illustrating a case in which an HE-SIG B is transmitted according to an embodiment of the present invention.

Referring to FIG. 24, when a frame is transmitted in a 40 MHz band, the HE-SIG B may be configured such that independent information is transmitted in each 20 MHz. That is, '1' and '2' of FIG. 24 indicate different HE-SIG B information.

Meanwhile, when a frame is transmitted in an 80 MHz band or a 160 MHz band, two pieces of independent HE-SIG B information transmitted in the 40 MHz band can be repeatedly transmitted in a next 40 MHz band(s). That is, in the case of a wideband frame, the HE-SIG B may be configured in the form of 1, 2, 1, 2, . . . , i.e., the form where '1' and '2' are repeated on the 20-MHz basis.

In addition, in the case of the above-mentioned independent HE-SIG Bs (i.e., '1' and '2'), resource allocation may be performed for chunks corresponding to different 20 MHz bands.

Figure 25:
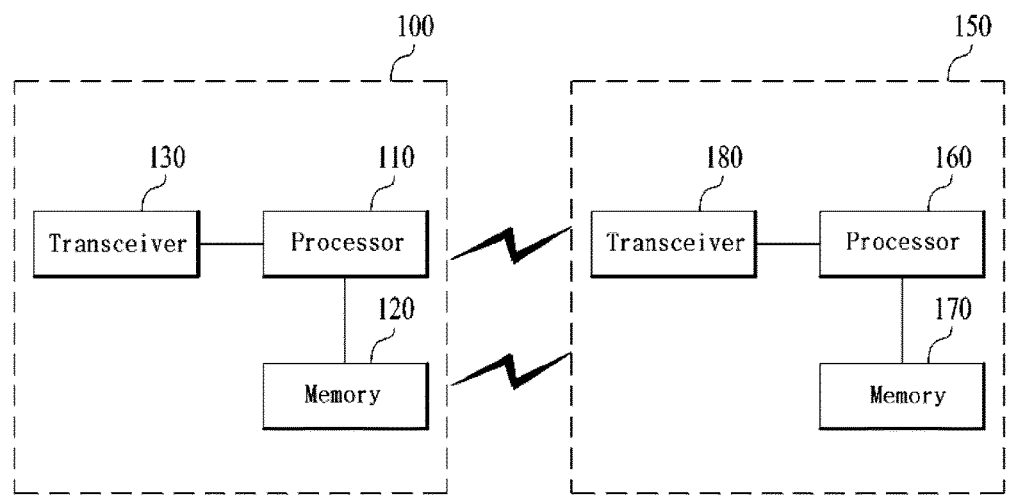
FIG. 25 is a block diagram illustrating exemplary configurations of an AP device (or base station device) and a station device (or user equipment device) according an embodiment of the present invention.

FIG. 25 is a block diagram illustrating exemplary configurations of an AP device (or base station device) and a station device (or user equipment device) according to an embodiment of the present invention.

An access point (AP) 100 may include a processor 110, a memory 120, and a transceiver 130. A station (STA) 150 may include a processor 160, a memory 170, and a transceiver 180.

The transceivers 130 and 180 may transmit and receive wireless signals and implement a physical layer according to IEEE 802. The processors 110 and 160 connected to the transceivers 130 and 180 may implement the physical layer and/or an MAC layer according to IEEE 802. The processors 110 and 160 may be configured to perform operations according to one of the aforementioned various embodiments of the present invention or any combination of two or more embodiments. In addition, modules for implementing operations of the AP and the STA according to the aforementioned embodiments of the present invention may be stored in the memories 120 and 170 and executed by the processors 110 and 160. The memories 120 and 170 may be included in the processors 110 and 160. Alternatively, the memories 120 and 170 may be provided to the outside of the processors 110 and 160 and connected to the processors 110 and 160 through known means.

Details of the AP device 100 and the STA device 150 may be respectively applied to a base station device and a user equipment device in other wireless communication systems (e.g. LTE/LTE-A).

The aforementioned configurations of the AP and STA devices may be implemented such that the above-described various embodiments of the present invention can be independently applied or two or more embodiments can be simultaneously applied, and description of redundant parts is omitted for clarity.

Figure 26:
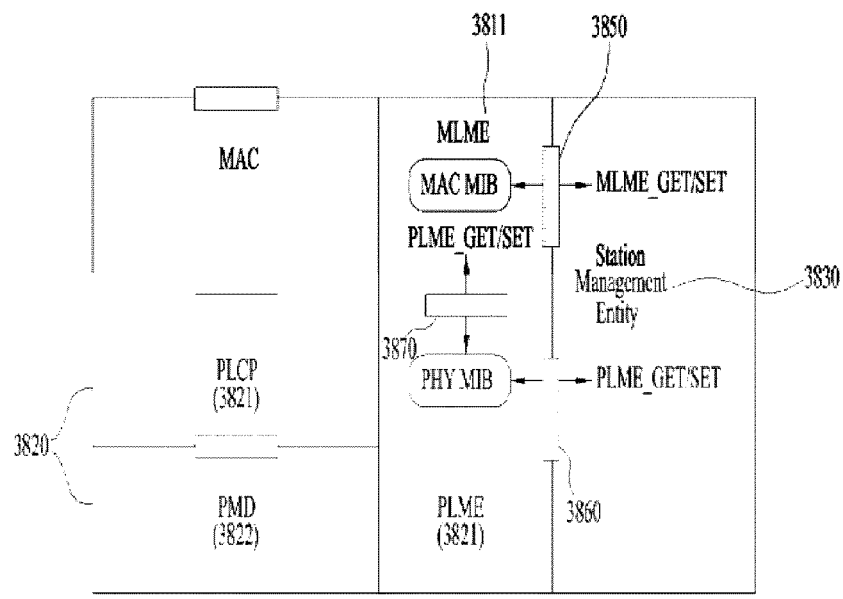
FIG. 26 illustrates an exemplary structure of a processor included in an AP device or a station device according to an embodiment of the present invention.

FIG. 26 illustrates an exemplary structure of a processor included in an AP device or a station device according to an embodiment of the present invention The processor of the AP or STA may include a plurality of layers. FIG. 26 shows a MAC sublayer 3810 and a physical layer (PHY) 3820 on a data link layer (DDL) from among the layers. As shown in FIG. 26, the PHY 3820 may include a PLCP (physical layer convergence procedure) entity 3821 and a PMD (physical medium dependent) entity 3822. Both the MAC sublayer 3810 and PHY 3820 include management entities called MLME (MAC sublayer management entity) 3811. These entities 3811 and 3821 provide a layer management service interface having a layer management function.

To provide correct MAC operation, a SME (station management entity) 3830 is present in each STA. The SME 3830 is a layer independent entity which can be regarded as being present in a separate management plane or as being off to the side. While functions of the SME 3830 are not described in detail herein, the SME 3830 collects layer-dependent states from various layer management entities (LMEs) and sets layer-specific parameters to have similar values. The SME 3830 may execute such functions and implement a standard management protocol on behalf of a general system management entity.

The entities shown in FIG. 26 interact with each other in various manners. FIG. 26 illustrates examples of exchanging GET/SET primitives. XX-GET.request primitive is used to request a predetermined MIB attribute (management information based attribute information). XX-GET.confirm primitive is used to return an appropriate MIB attribute information value when a status field indicates "success" and to return error indication in the status field when the status field does not indicate "success". XX-SET.request primitive is used to request an indicated MIB attribute to be set to a predetermined value. When the MIB attribute indicates a specific operation, the MIB attribute requests to perform the operation. XX-SET.confirm primitive is used to confirm that the indicated MIB attribute is set to the requested value when the status field indicates "success" and to return error conditions in the status field when the status field does not indicate "success". When the MIB attribute indicates the specific operation, it is confirmed that the corresponding operation has been performed.

As shown in FIG. 26, the MLME 3811 and SME 3830 can exchange various MLME_GET/SET primitives through a MUTE SAP 3850. In addition, various PLCM_GET/SET primitives can be exchanged between the PLME 3821 and the SME 3830 through a PLME_SAP 3860 and exchanged between the MLME 3811 and the PLME 3821 through a MLME-PLME_SAP 3870.

The aforementioned embodiments of the present invention can be implemented using various means. For instance, the embodiments of the present invention can be implemented using hardware, firmware, software and/or any combinations thereof.

In the case of implementation by hardware, methods according to the embodiments of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In the case of implementation by firmware or software, methods according to the embodiments of the present invention can be implemented by modules, procedures, and/or functions for performing the above-explained functions or operations. The software code is stored in a memory unit and can be driven by a processor. The memory unit is provided within or outside the processor to exchange data with the processor through the various means known to the public.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the embodiments described herein, but should be accorded the broadest scope consistent with the principles and novel features disclosed herein. It will be apparent that, although the preferred embodiments have been shown and described above, the present specification is not limited to the above-described specific embodiments, and various modifications and variations can be made by those skilled in the art to which the present invention pertains without departing from the gist of the appended claims. Thus, it is intended that the modifications and variations should not be understood independently of the technical spirit or prospect of the present specification.

In addition, the present specification describes both a product invention and a method invention, and descriptions of both the inventions may be complementarily applied as needed.

INDUSTRIAL APPLICABILITY

The aforementioned embodiments of the present invention can be applied to various wireless communication system including the IEEE 802.11 system.

What is claimed is:

1. A method of transmitting resource allocation information for data transmission to one or more stations (STAs) by an access point (AP) in a wireless local area network (WLAN) system, the method comprising:
configuring, at the AP, a frame including a signaling field and a data field,
wherein the signaling field is configured to include a first signaling field (SIG A field) including common control information for the one or more STAs and a second signaling field (SIG B field) including user specific control information for each of the one or more STAs, and
wherein the SIG B field is configured to include the resource allocation information for the data transmission to the one or more STAs; and
transmitting, by the AP, the configured frame to the one or more STAs,
wherein the resource allocation information of the SIG B field transmitted on a first frequency band includes resource allocation information for data to be transmitted in a second frequency band, the second frequency band being different from the first frequency band.

2. The method of claim 1, wherein the SIG B field is configured such that independent control information is transmitted in a first 20 MHz band and a second 20 MHz band, the second 20 MHz band being continuously adjacent to the first 20 MHz band.

3. The method of claim 1, wherein the SIG B field is configured such that control information transmitted in a first 20 MHz band is duplicated to a second 20 MHz band, and the duplicated control information is transmitted in the second 20 MHz band.

4. The method of claim 2, wherein the SIG B field transmitted in the first 20 MHz band includes resource allocation information for data to be transmitted in the second 20 MHz band.

5. The method of claim 1, wherein the resource allocation information includes first resource allocation information indicating resources to be used for transmitting the data on a chunk corresponding to 242 tones.

6. The method of claim 5, wherein the resource allocation information further includes second resource allocation information indicating resources allocated to each of the one or more STAs within the chunk corresponding the 242 tones.

7. The method of claim 5, wherein the resource allocation information includes at least one of a chunk index, the number of chunks, a start chunk index, and resource configuration information.

8. The method of claim 2, wherein a time domain length of the SIG B field in the first 20 MHz band is equal to the time domain length of the SIG B field in the second 20 MHz band.

9. The method of claim 8, wherein the number of STAs that receive the allocated resources through the SIG B field in each of the first and second 20 MHz bands is determined based on the time domain length of the SIG B field in each of the first and second 20 MHz bands.

10. A method of receiving resource allocation information for data reception from an access point (AP) by a first station (STA) in a wireless local area network (WLAN) system, the method comprising:
receiving, by the first STA, a frame including a signaling field and a data field from the AP,
wherein the signaling field includes a first signaling field (SIG A field) including common control information for one or more STAs including the first STA and a second signaling field (SIG B field) including user specific control information for each of the one or more STAs, and
wherein the SIG B field includes resource allocation information for data transmission to the one or more STAs; and
processing, at the first STA, the received frame, wherein the first STA process the resource allocation information of the SIG B field received on a first frequency band as including resource allocation information for data to be received in a second frequency band, the second frequency band being different from the first frequency band.

11. The method of claim 10, wherein the SIG B field is processed such that independent control information is included in a first 20 MHz band and a second 20 MHz band, the second 20 MHz band being continuously adjacent to the first 20 MHz band.

12. The method of claim 10, wherein the SIG B field is processed such that control information included in a first 20 MHz band is duplicated to a second 20 MHz band, and the duplicated control information is included in the second 20 MHz band.

13. The method of claim 11, wherein the SIG B field included in the first 20 MHz band includes resource allocation information for data to be received through the second 20 MHz band.

14. An access point (AP) device for transmitting resource allocation information for data transmission to one or more stations (STAs) in a wireless local area network (WLAN) system, the AP device comprising:
a transceiver configured to transmit and receive signals to and from the one or more STAs; and
a processor connected to the transceiver and configured to transmit a frame including a signaling field and a data field to the one or more STAs through the transceiver,
wherein the processor configures the signaling field to include a first signaling field (SIG A field) including common control information for the one or more STAs and a second signaling field (SIG B field) including user specific control information for each of the one or more STAs, wherein the processor configures the SIG B field to include the resource allocation information for the data transmission to the one or more STAs, and wherein the processor configures the resource allocation information of the SIG B field to be transmitted on a first frequency band to include resource allocation information for data to be transmitted in a second frequency band, the second frequency band being different from the first frequency band.

15. A station (STA) device for receiving resource allocation information for data reception from an access point (AP) in a wireless local area network (WLAN) system, the station device comprising:

a transceiver configured to transmit and receive signals to and from the AP; and a processor connected to the transceiver and configured to receive a frame including a signaling field and a data field from the AP through the transceiver, wherein the signaling field includes a first signaling field (SIG A field) including common control information for one or more STAs including the STA and a second signaling field (SIG B field) including user specific control information for each of the one or more STAs, wherein the SIG B field includes resource allocation information for data transmission to the one or more STAs, and wherein the processor processes the resource allocation information of the SIG B field received on a first frequency band as including resource allocation information for data to be transmitted in a second frequency band, the second frequency band being different from the first frequency band.

* * * * *